US010889384B2

(12) United States Patent
Parsons

(10) Patent No.: US 10,889,384 B2
(45) Date of Patent: Jan. 12, 2021

(54) ROTORCRAFT ENGINE INLET CONFIGURATION TO OPTIMIZE PERFORMANCE IN BOTH HOVER AND HIGH SPEED FLIGHT

(71) Applicant: Textron Innovations Inc., Providence, RI (US)

(72) Inventor: Thomas Dewey Parsons, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 535 days.

(21) Appl. No.: 15/710,622

(22) Filed: Sep. 20, 2017

(65) Prior Publication Data

US 2019/0084688 A1     Mar. 21, 2019

(51) Int. Cl.
*B64D 33/02*     (2006.01)
*B64C 33/02*     (2006.01)
(Continued)

(52) U.S. Cl.
CPC .............. *B64D 33/02* (2013.01); *B64C 33/02* (2013.01); *F02C 7/04* (2013.01); *F02C 7/042* (2013.01);
(Continued)

(58) Field of Classification Search
CPC . B64D 33/02; F02C 7/04; F02C 7/042; F02C 7/057
See application file for complete search history.

(56) References Cited

U.S. PATENT DOCUMENTS 3,421,296 A * 1/1969 Beurer ..................... F02C 7/052
                                                         55/306
3,449,891 A * 6/1969 Amelio ................... B64D 33/02
                                                         55/306
(Continued)

FOREIGN PATENT DOCUMENTS

EP     2853493 A1    4/2015
EP     2853493 B1    8/2016
(Continued)

OTHER PUBLICATIONS

European Patent Office, European Search Report, EP17196041, dated May 16, 2018, 5 pages.
(Continued)

*Primary Examiner* — Philip J Bonzell
(74) *Attorney, Agent, or Firm* — Whitaker Chalk Swindle & Schwa; Enrique Sanchez, Jr.

(57) ABSTRACT

The present invention achieves technical advantages as a rotorcraft engine inlet configuration to optimize performance in both hover and high-speed flight. A rotorcraft fuselage with a ram air intake and a side air intake allows airflow into the engine inlet plenum. A door can be operably coupled to the fuselage, wherein the door is in an open position when the airspeed is below a first threshold and is in a closed position when the airspeed exceeds a second threshold. Additionally, control logic, compares the rotorcraft airspeed with a stored airspeed to operate an actuator to open and close the door to modulate the airflow into the engine inlet plenum. The present invention realizes the advantages of eliminating the inlet spillage drag due to inlet ram airflow in forward flight and increasing the available engine power by mitigating the loss of inlet air pressure recovery.

12 Claims, 5 Drawing Sheets

(51) Int. Cl.
  *F02C 7/057* (2006.01)
  *F02C 7/04* (2006.01)
  *F02C 7/042* (2006.01)
  *B64C 27/04* (2006.01)

(52) U.S. Cl.
  CPC .............. *F02C 7/057* (2013.01); *B64C 27/04* (2013.01); *B64D 2033/0253* (2013.01); *F05D 2220/329* (2013.01)

(56) References Cited

U.S. PATENT DOCUMENTS

| | | | | |
|---|---|---|---|---|
| 8,096,499 | B2* | 1/2012 | Osswald | F02C 7/052 |
| | | | | 244/53 B |
| 8,439,297 | B2* | 5/2013 | Colaprisco | F02C 7/055 |
| | | | | 244/53 B |
| 9,254,921 | B2* | 2/2016 | Braeutigam | B64D 33/02 |
| 9,499,276 | B2* | 11/2016 | Braeutigam | B64D 33/02 |
| 9,902,500 | B2* | 2/2018 | Stadler | B64D 33/04 |
| 2002/0182062 | A1 | 12/2002 | Scimone | |
| 2007/0022723 | A1* | 2/2007 | Stelzer | B64D 33/02 |
| | | | | 55/502 |
| 2007/0025838 | A1 | 2/2007 | Stelzer | |
| 2010/0065139 | A1* | 3/2010 | Osswald | B64D 33/02 |
| | | | | 137/625.44 |
| 2011/0108676 | A1* | 5/2011 | Colaprisco | F02C 7/055 |
| | | | | 244/53 B |
| 2014/0158833 | A1* | 6/2014 | Braeutigam | B64D 33/02 |
| | | | | 244/53 B |
| 2015/0090844 | A1* | 4/2015 | Braeutigam | B64D 27/02 |
| | | | | 244/53 B |
| 2015/0367945 | A1* | 12/2015 | Stadler | B64D 27/10 |
| | | | | 415/144 |
| 2016/0090915 | A1* | 3/2016 | Wolff | B64D 41/00 |
| | | | | 60/794 |
| 2018/0208323 | A1* | 7/2018 | Parsons | B64D 33/02 |

FOREIGN PATENT DOCUMENTS

| | | |
|---|---|---|
| FR | 3048233 A1 | 9/2017 |
| WO | 2010077241 A1 | 7/2010 |

OTHER PUBLICATIONS

European Patent Office, Communication pursuant to Article 94(3) EPC, EP17196041.2, dated Jun. 4, 2018, 5 pages.
European Patent Office, Communication pursuant to Article 94(3) EPC, EP17196041.2, dated Dec. 21, 2018, 9 pages.

* cited by examiner

ROTORCRAFT ENGINE INLET CONFIGURATION TO OPTIMIZE PERFORMANCE IN BOTH HOVER AND HIGH SPEED FLIGHT

BACKGROUND OF THE INVENTION

1. Field of the Invention

The present invention is generally related to aircraft engine inlet systems, and more specifically to a configurable engine inlet system for optimizing the performance of a rotorcraft engine.

2. Background of the Invention

With advances in the field of rotorcraft flight, helicopters are going faster than they ever have before. Rotorcraft engine inlets therefore need optimal performance in multiple flight regimes, from hover to high-speed flight. Optimal inlet designs can vary depending on where in the flight envelope performance needs to be optimized. To aid in these significant gains in rotorcraft airspeed, sophisticated analysis of analytics such as engine inlet performance have become much more important. For example, Computational Fluid Dynamics (CFD) analysis of inlet airflow entering an engine is typically conducted to ensure maintenance of inlet airflow pressure recovery. Inlet pressure recovery is the measure of the freestream total air pressure recovered at the engine inlet. An increase in pressure recovery has a direct impact on engine power available, and thus rotorcraft performance (i.e. increased maximum airspeed, increase gross weight capability, etc. . . . ).

Common approaches to increase engine performance include the use of ram air intake systems. U.S. Pat. No. 9,499,276, relates to a two-inlet system for a traditional twin engine helicopter using ram air. The patent discloses improved engine performance from ram air provided to the engine to increase air pressure at the engine inlet, which increases the power available from the engine, and ultimately increases air speed. However, this approach has the disadvantage of not being able to maintain the air pressure in the inlet plenum when the rotorcraft has significant airspeed. Instead, the excess air will be expelled via the lateral air inlet port, resulting in a loss in performance. When significant airspeed speed is achieved, the engine will not be able to maintain all of the air, as some of the airflow will spill out of the lateral inlet port, thereby creating additional drag on the aircraft.

SUMMARY OF THE INVENTION

The present invention achieves technical advantages as a rotorcraft engine inlet configuration to optimize performance in both hover and high-speed flight. One exemplary embodiment of the invention discloses a configurable air inlet system for a rotorcraft. The rotorcraft includes a rotorcraft fuselage having an engine disposed within the fuselage. A ram air intake can be disposed in the fuselage and allows a ram airflow to enter the fuselage. A side air intake can also be disposed in a side of the fuselage to allow side airflow into the fuselage from the side of the rotorcraft. An air inlet plenum can be coupled to the ram air intake and the side air intake, wherein the air inlet plenum directs the ram airflow and the side airflow to the engine. A door can be operably coupled to the fuselage, wherein the door is in an open position when the airspeed is below a first threshold and is in a closed position when the airspeed exceeds a second threshold.

Another exemplary embodiment includes a rotorcraft airflow modulation system with a rotorcraft having a fuselage. A fuselage door can be operably coupled to the fuselage and an airspeed indicator adapted to determine the speed of the rotorcraft. A door actuator can be operatively coupled to the door and the fuselage, so that the actuator opens and closes the door. Additionally, control logic, having a memory, receives the speed of the aircraft from the airspeed indicator and compares the airspeed with a stored airspeed. The control logic can operate the actuator to open and close the door to modulate the airflow into the fuselage. The control logic preferably automatically operates the actuator to open and close the door without pilot input. Alternatively, the pilot can manually operate the actuator to open and close the door.

The disclosed embodiments "capture" the ram air and prevent its outflow, thereby improving aircraft performance. The present invention realizes the advantages of eliminating the spillage drag on the aircraft due to inlet airflow in forward flight and increasing the available engine power by mitigating the loss of inlet air pressure recovery. The disclosed embodiments isolate the ram airflow received from the ram air intake (optimized for high airspeed) from the side air intake (optimized for hover). Other embodiments in accordance with the spirit and scope of the invention will become apparent to those of skill in the art.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
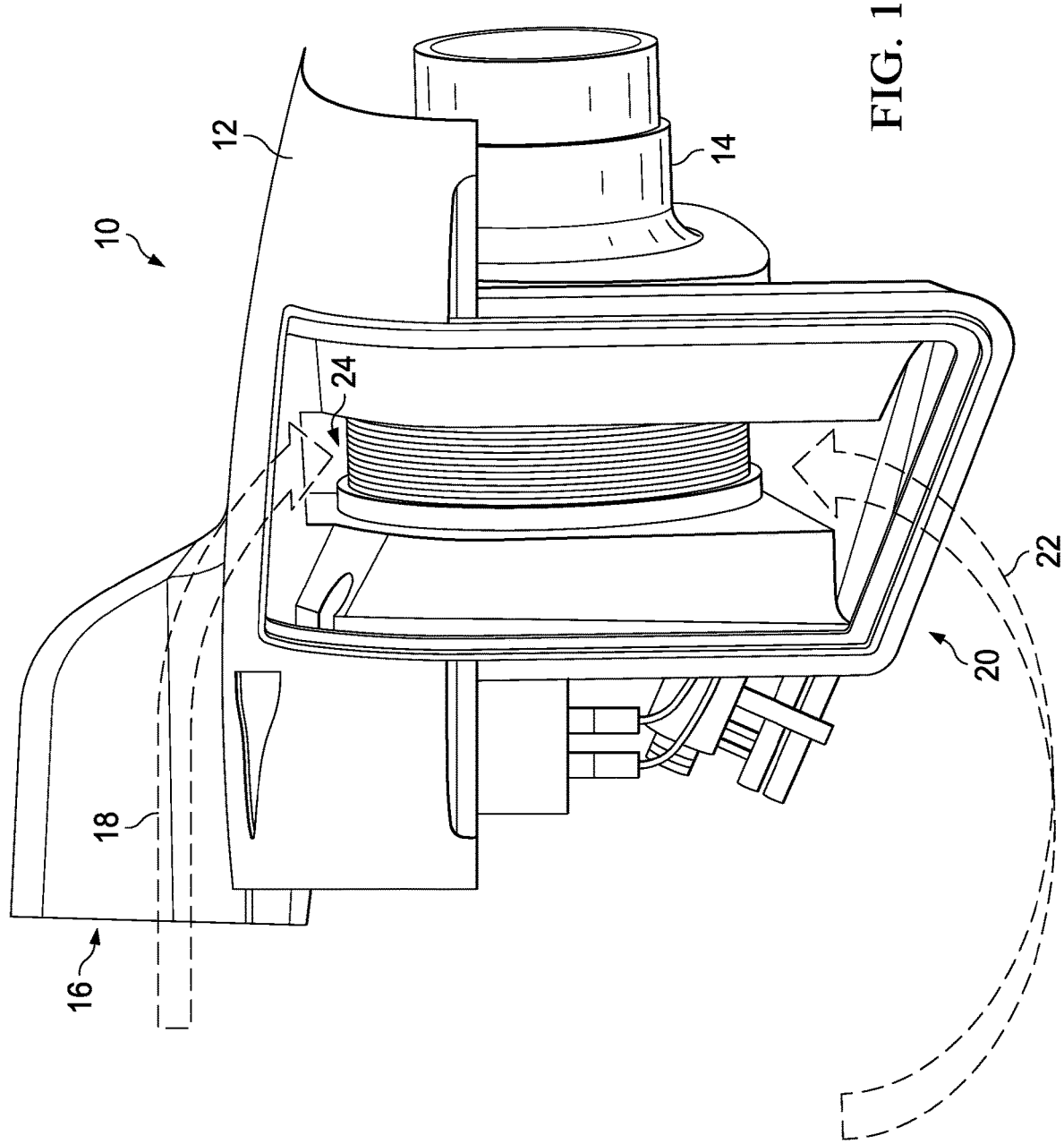
FIG. 1 is a side view of a rotorcraft having a ram air intake and a side air intake, in accordance with an embodiment of the claimed invention.

FIG. 1 is a side view of a portion of a rotorcraft, designated generally as 10, having a ram air intake 16 and a side air intake 20, in accordance with an embodiment of the claimed invention. The rotorcraft 10 includes a fuselage 12. The fuselage 12 houses an engine 14 for providing power to the rotorcraft's transmission. The ram air intake 16 improves engine performance during high speed forward flight by forcing ram airflow 18 into an air inlet plenum 24. The ram airflow 18 increases the total air pressure in the air inlet plenum 24, which optimizes the performance of the engine 14 by increasing the available power. The side air intake 20 improves engine performance during hover by supplying side airflow 22 to the engine 14 with minimal pressure loss. When rotorcraft 10 hovers, the lack of forward flight mitigates the amount of air that enters the ram air intake 16. So, the side airflow 22 enters side air intake 20. The side airflow 22 path is a more optimal path for hover, because pressure losses are minimized, thereby maximizing the air pressure in the air inlet plenum 24, which optimizes the performance of the engine 14 by increasing the available power.

Figure 2:
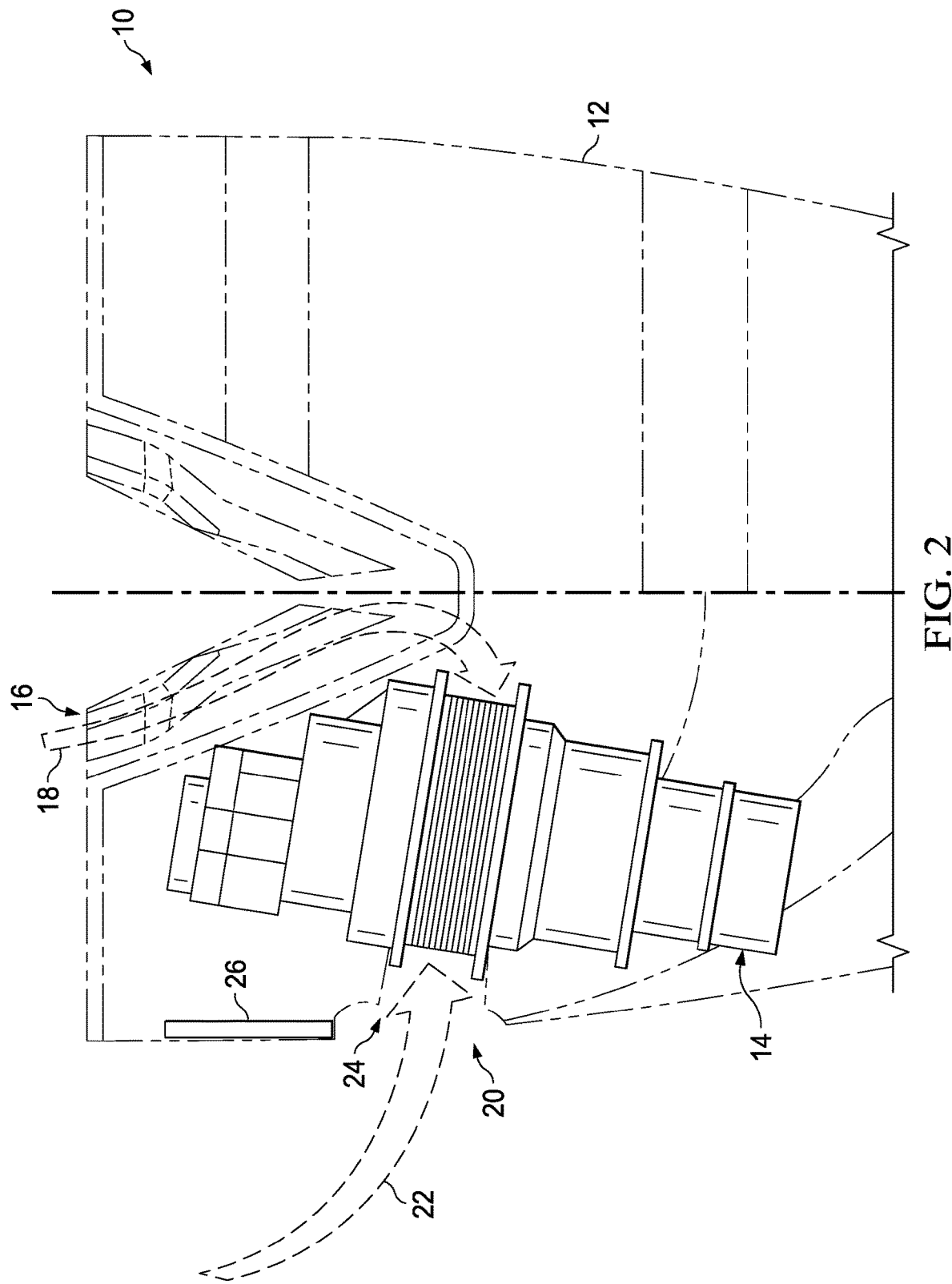
FIG. 2 is a top-perspective view of a configurable air inlet system, having a door in an open position, in accordance with an embodiment of the claimed invention.

FIG. 2 is a top-perspective view of a configurable air inlet system, having a door in an open position, in accordance with an embodiment of the claimed invention. Inlet door 26 is disposed within the fuselage 12. The door 26 can be made of the same material as the fuselage, or other suitable material. The configurable air inlet system preferably includes a door actuator that operates the door 26 by sliding, rotating, hinging, or otherwise suitably manipulating the door 26 open or closed. The door 26 can be mechanically actuated, such as with an electrical actuator, or other suitable mechanical actuation. Alternatively, the door 26 can be passively actuated, such as spring loaded with air loads, or other suitable passive actuation. The door actuator's opening and closing of the door 26 can be automated or controlled via pilot control. A manual override can allow the pilot to control door position. During the rotorcraft 10 hover, the door 26 is held in the open position (as shown in FIG. 2) and secured within the fuselage 12 by the door actuator. The door 26 substantially clears the side air intake 20, thereby substantially unimpeding side airflow 22 from entering the air inlet plenum 24.

The door 26 slides open during rotorcraft hover to minimize hover losses. Using the ram air intake 16 as the sole airflow path while the rotorcraft 10 is hovering results in unacceptably high pressure losses in the air inlet plenum 24 that reduce the available engine power and reduce rotorcraft performance. The side air intake 20 facilitates optimal hover performance by allowing side airflow 22 to enter the air inlet plenum 24 to improve the performance of the engine 14.

The requirements for optimal performance of the engine 14 vary by flight mode: hover or forward flight. In one embodiment, should the door actuator fail, the door 26 defaults to the open position, unobstructing the side air intake 20. However, the default fail position can be preprogrammed to a specific position: open, closed, or some midpoint therebetween.

During a typical flight profile, the door 26 is open during engine start thru lift to hover. As the rotorcraft 10 begins gaining forward airspeed, the door closes when airspeed exceeds a predetermined airspeed. The door remains closed during cruise flight. As the rotorcraft 10 decelerates, the door opens at a predetermined airspeed, or airspeed range, and remains open during approach to hover.

Figure 3:
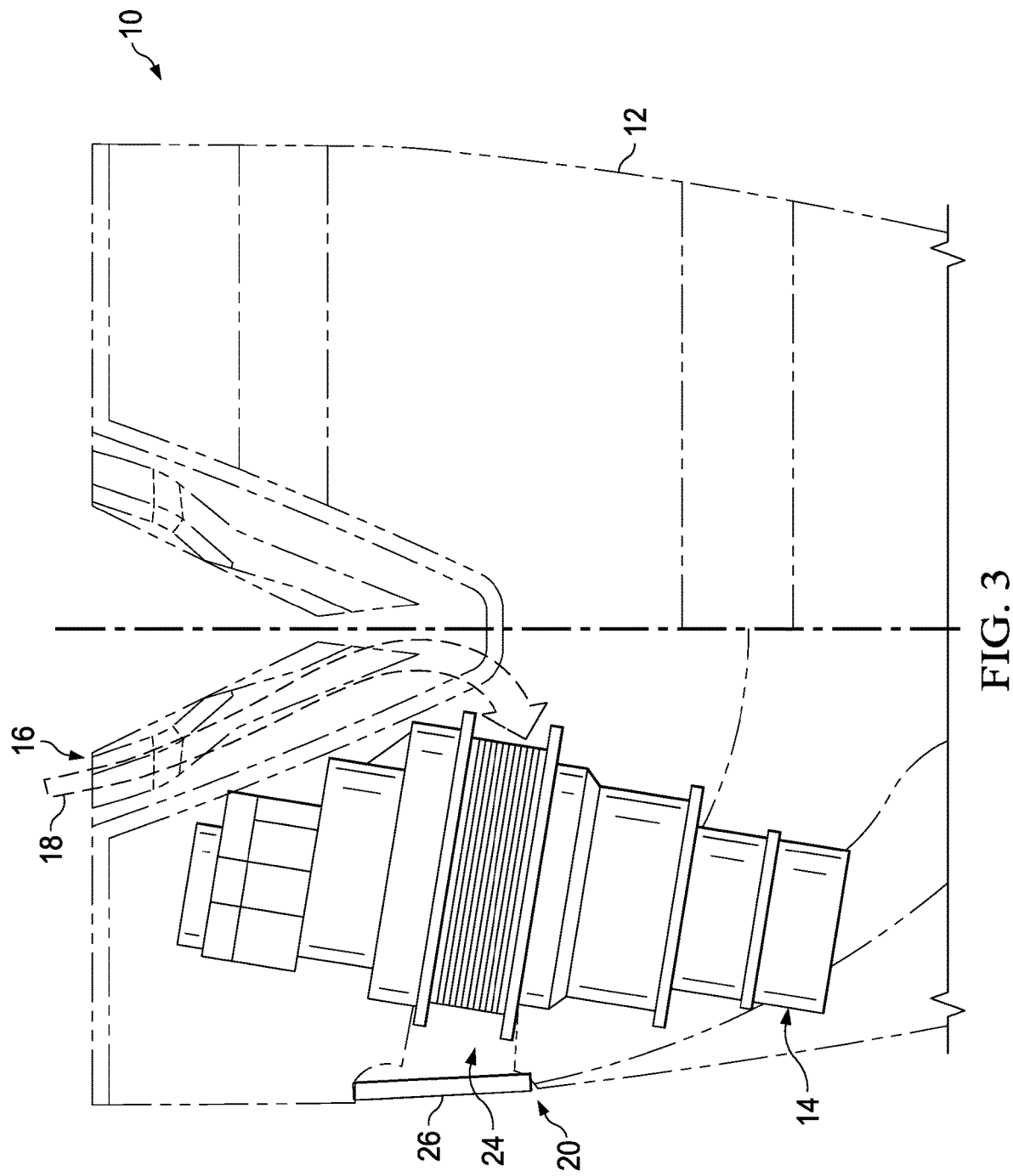
FIG. 3 is a top-perspective view of a portion of the fuselage having a door in a closed position, in accordance with an embodiment of the present invention.

FIG. 3 is a top-perspective view of a portion of the fuselage having a door in a closed position, in accordance with an embodiment of the present invention. When in a closed position, inlet door 26 preferably creates an airtight seal with fuselage 12 by engaging with side air intake 20. The door 26 can be made of the same material as the fuselage, or other suitable material. Additionally, the door 26 can include a flange to engage with the inside of the fuselage 12, when closing the side air intake 20. The flange of the door 26 can include a gasket, or other suitable material, around its circumference for creating an air-tight seal when engaging the inside of the fuselage 12.

While closed, the door 26 is flush with the exterior of the fuselage 12 to mitigate negative conditions, such as additional drag. The door actuator closes the door 26 by sliding, rotating, hinging, or otherwise suitably manipulating the door 26 into the side air intake 20. The door 26 can be mechanically actuated, such as with an electrical actuator, or other suitable mechanical actuation. Alternatively, the door 26 can be passively actuated, such as spring loaded with air loads, or other suitable passive actuation. The door actuator's opening and closing of the door 26 can be automated or controlled via pilot control. A manual override switch can allow the pilot to control door position.

During forward flight of the rotorcraft 10, the door 26 is maintained in the closed position by the door actuator. The door 26 closes the side air intake 20, thereby preventing side airflow 22 from entering the air inlet plenum 24. In another embodiment, an intake filter is disposed within the side air intake 20. During cruise flight with forward airspeed, closing the side door will increase the total pressure inside the inlet plenum and prevent outflow (i.e., "spillage drag"), which can manifest itself as aircraft drag.

The door 26 isolates the ram airflow 18 from the side air intake 20. Without the door 26, at high flight speed, the ram airflow 18 would spill out of the side air intake 20, due to the increased air pressure in the air inlet plenum 24. Without the door 26, the inlet recovery pressure is reduced during forward flight, thereby decreasing the engine power available. Adding the door 26 allows the capture of the ram airflow 18 to mitigate a loss in inlet pressure recovery. The effect of closing the door 26, is an increase in the available engine power and consequently improved rotorcraft performance.

In operation, the door 26 opens and closes as a function of forward airspeed readings from an airspeed indicator. During hover airspeeds, the actuator positions the door 26 in the open position. When the airspeed of rotorcraft 10 exceeds a threshold airspeed, the door is closed. As airspeed reduces, the door opens when airspeed drops below a second threshold airspeed.

Figure 4:
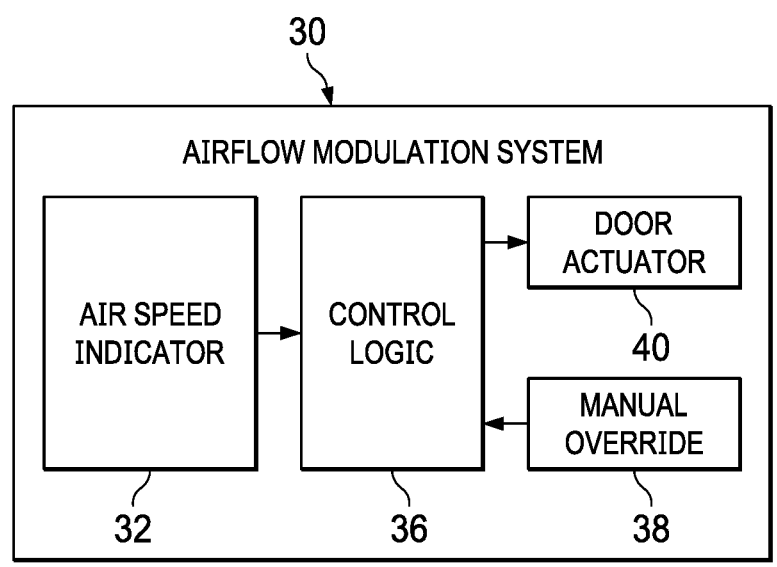
FIG. 4 is a block diagram of an airflow modulation system, in accordance with an embodiment of the present invention.

FIG. 4 is a block diagram of an airflow modulation system, in accordance with an embodiment of the present invention. The airflow modulation system 30 includes airspeed indicator 32, control logic 36, manual override 38, and door actuator 40.

The airspeed indicator 32 can provide an airspeed of the rotorcraft 10. The airspeed indicator 32 is preferably a conventional airspeed indicator, such as part of the pitot-static system, using a differential pressure system that measures both dynamic air pressure and static pressure. Alternatively, the airspeed indicator 32 can be an electronic airspeed indicator, such as that used with an air data computer. The airspeed indicator 32 can be any other indication or measurement of the aircraft's airspeed, including data on the aircraft data bus traffic.

The manual override 38 can provide a control signal to the control logic 36, to force the door actuator 40 to position the door 26 in a user-selected position. The manual override 38 is preferably a switch that can be held in an operational position to cause the door actuator 40 to move the door 26 as long as the switch is in the operation position, up to the maximum extension of the door actuator 40. Alternatively, the switch can move in two directions from the center position to allow the door actuator 40 to position the door 26 in an open position or a closed position. Alternatively, the switch can be a three-position switch: MANUAL OPEN, MANUAL CLOSED, and AUTOMATIC (using control logic as function of airspeed). The door actuator 40 can operate the door 26 by sliding, rotating, hinging, or otherwise suitably manipulating the door 26 into an open or closed position. The door actuator 40 can be an electrical actuator, or other suitable mechanical actuation. Alternatively, the door actuator 40 can be a passive actuator, such as a spring loaded actuator with air loads, or other suitable passive actuation. The door actuator's 40 opening and closing of the door 26 can be automated or controlled via pilot control.

The control logic 36 is adapted to control the door actuator 40 based on input from the airspeed indicator 32 or the manual override 38. The control logic 36 preferably includes a memory for storing the airspeed threshold and an algorithm for controlling the door actuator 40. The control logic 36 can be a microcontroller, microprocessor, field-programmable gate array, application-specific integrated circuit, or other suitable device. The control logic 36 is programmed to execute the control algorithm of receiving an airspeed from an airspeed indicator; determining whether the rotorcraft is hovering (such as, for example, airspeeds below a first threshold) or in forward flight (such as, for example, airspeeds above a second threshold); opening the door if the rotorcraft is hovering to allow side airflow to enter an air inlet plenum; and closing the door if the rotorcraft is in forward flight to contain ram airflow within the air inlet plenum and increase inlet recovery pressure. The control logic 36 can operate the door actuator 40 based upon the airspeed.

The control logic 36 can receive the airspeed of the aircraft from the airspeed indicator, compare the airspeed with one or more stored airspeed thresholds, and operate the actuator to open and close the door to modulate the airflow into the inlet plenum based on the relationship of the received airspeed to the one or more stored airspeed thresholds. In one embodiment, the control logic operates the door actuator 40 to position the door 26 in an open position when the rotorcraft airspeed is at or below a first threshold airspeed. The control logic operates the door actuator 40 to position the door 26 in a closed position when the rotorcraft airspeed is at or above a second threshold airspeed. The first threshold airspeed is preferably 40 knots and the second threshold airspeed is preferably 60 knots, however the first and second threshold airspeeds can vary by application and rotorcraft.

The airflow modulation system 30 can also detect an engine failure in dual engine configurations, such that the system can conduct one engine inoperative (OEI) flight procedures, a including 30-second OEI power when hovering. In such situations, control logic 36 preferably continues to operate as a function of the airspeed, as indicated above. Alternatively, control logic can operate the door actuator 40 to place the door 26 in the open position.

Figure 5A:
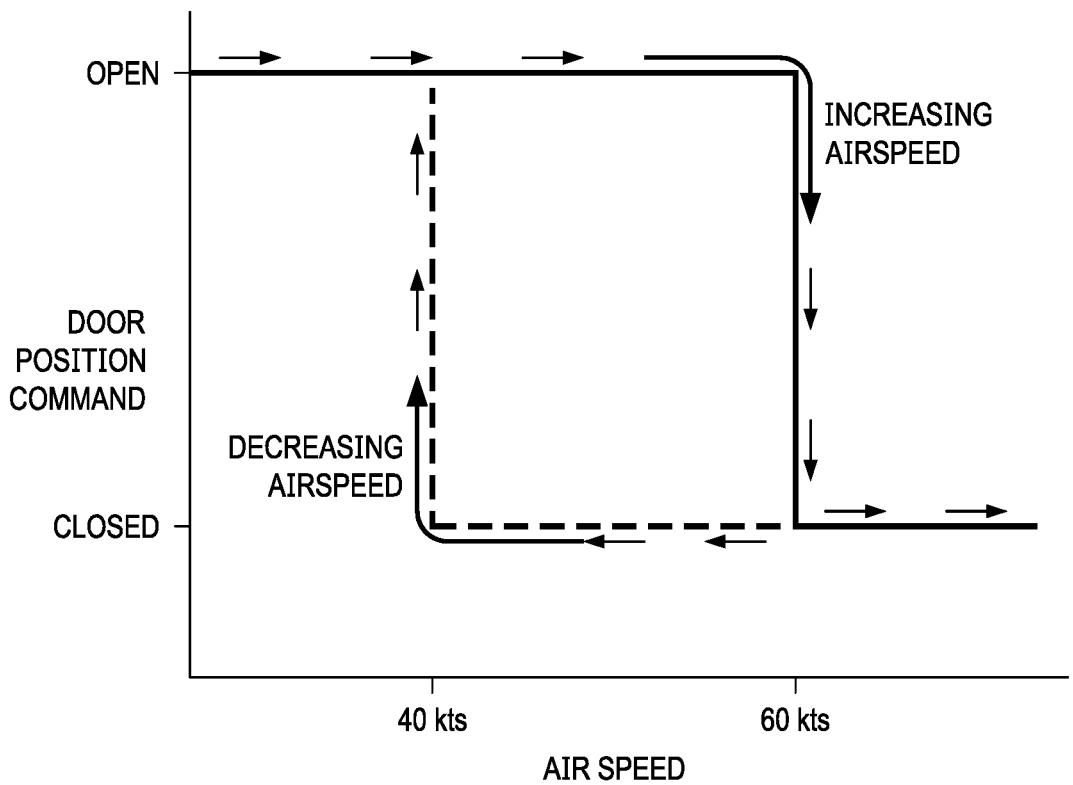
FIG. 5A is a chart showing a door position command versus airspeed schedule, in accordance with an embodiment of the present invention.

FIG. 5A is a chart showing a door position command versus airspeed schedule, in accordance with an embodiment of the present invention. The control logic 36 can operate the door actuator 40 to position the door 26 in an open or closed position by sending a door position command to the actuator 40 according to the airspeed schedule of FIG. 5A. The door position command can be a voltage, flag, binary value, or any other suitable signal. The control logic 36 determines whether the airspeed is increasing or decreasing to determine the appropriate door position command to send to actuator 40.

When the airspeed is increasing from zero knots up to an airspeed below a second threshold, the control logic 36 sends an "open" door position command to the actuator 40 to manipulate the door 26 into a full-open position. Once the airspeed exceeds the second threshold, a "closed" door position command is sent to the actuator 40 to manipulate the door 26 into a full-closed position. The second threshold is preferably sixty knots, but can be programmed to any suitable number. In one embodiment, the door position command is sent periodically. Alternatively, the door position command can be sent to the actuator 40 asynchronously, such as when airspeed changes between increasing and decreasing.

When the airspeed is decreasing down to an airspeed above a first threshold, the control logic 36 sends a "closed" door position command to the actuator 40 to manipulate the door 26 into a full-closed position. The first threshold is preferably forty knots, but can be programmed to any suitable number. Once the airspeed is below the first threshold, an "open" door position command is sent to the actuator 40 to manipulate the door 26 into a full-open position. In one embodiment, the door position command is sent periodically. Alternatively, the door position command can be sent to the actuator 40 asynchronously, such as when airspeed changes between decreasing and increasing.

Figure 5B:
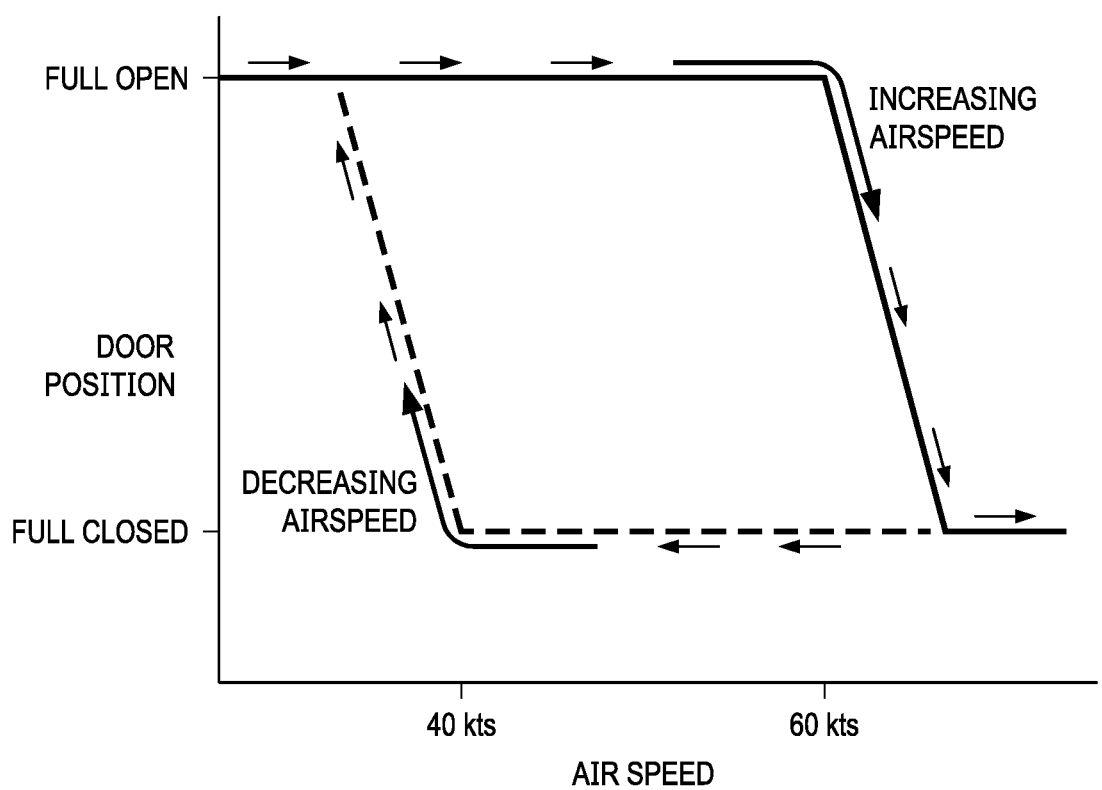
FIG. 5B is a chart showing the corresponding door position versus airspeed schedule, in accordance with another embodiment of the present invention.

FIG. 5B is a chart showing a door position versus airspeed schedule, in accordance with an embodiment of the present invention. The door 26 is operably coupled to the fuselage, and the door 26 is in a full-open position when the airspeed is below a first threshold and is in a full-closed position when the airspeed exceeds a second threshold. In one embodiment, when the airspeed is increasing from zero knots to a speed below a second threshold, or when the airspeed is decreasing from the first threshold, the door 26 is maintained in a full-open position to allow side airflow 22 to enter the air inlet plenum 24 and lower the pressure drop within the air inlet plenum 24 to maximize the rotorcraft 10 hover performance. When flying at high airspeeds, such as above a second airspeed threshold, the door 26 is manipulated into a full-closed position to effectively stop the ram airflow 22 from exiting the air inlet plenum 24 through the side air intake 20, to increase pressure in the air inlet plenum 24 and maximize engine power (and also to eliminate spillage drag). The first threshold airspeed is preferably forty knots and the second threshold airspeed is preferably sixty knots, however the first and second threshold airspeeds can vary by application and rotorcraft. During the speed transition between forty knots and sixty knots, no significant performance advantage is achieved by having the door 26 in an open or closed position, therefore, the door can be in an open, closed, or other position. Alternatively, the first threshold airspeed can vary between a first tolerance to allow door 26 to transition to a closed position and the second threshold airspeed can vary between a second tolerance to allow door 26 to transition to an open position, to account for different flight conditions and engine requirements. The first and second tolerances are preferably ten knots, but can be programmed to be any suitable value.

The present invention achieves the following advantages over the prior art.
a) increases inlet recovery at high airspeeds;
b) increases engine power available at high airspeeds;
c) increases aircraft performance at high airspeeds; and
d) eliminates spillage drag at high airspeeds.

While the present invention has been described in detail, it is not intended to be limited. Accordingly, various changes, variations, and substitutions may be made without departing with the scope of the invention as disclosed.

What is claimed is:

1. A configurable air inlet system, comprising:
a rotorcraft fuselage having an engine disposed within the fuselage;
a ram air intake disposed in the fuselage and adapted to allow a ram airflow into the fuselage;
a side air intake disposed in a side of the fuselage and adapted to allow side airflow into the fuselage from the side of the rotorcraft fuselage;
an air inlet plenum coupled to the ram air intake and the side air intake, wherein the air inlet plenum directs the ram airflow and the side airflow to the engine;
a door operably coupled to the fuselage and configured to open and close the side air intake, wherein the door is in an open position when the airspeed is below a first threshold and is in a closed position when the airspeed exceeds a second threshold, wherein the second threshold is above the first threshold; and
control logic adapted to determine whether the airspeed is at or below the first threshold or at or above the second threshold to control the door position.

2. The configurable air inlet system of claim 1, wherein the door isolates the ram airflow from the side airflow when the door is closed.

3. The configurable air inlet system of claim 1, wherein the air pressure in the air inlet plenum is higher when the door is closed than when the door is open.

4. The configurable air inlet system of claim 1, wherein the door is substantially flush with the fuselage when closed.

5. The configurable air inlet system of claim 1, wherein the door captures the ram air to prevent a loss in inlet pressure recovery, when the door is in a closed position.

6. The configurable air inlet system of claim 1, wherein the first threshold is approximately forty knots.

7. The configurable air inlet system of claim 1, wherein the second threshold is approximately sixty knots.

8. The configurable air inlet system of claim 1, further including a door actuator, wherein the door actuator slides the door into position.

9. A rotorcraft airflow modulation system, comprising:
a rotorcraft having a fuselage;
a ram air intake disposed in the fuselage and adapted to allow a ram airflow into the fuselage;
a fuselage door, operably coupled to the fuselage and configured to open and close a side air intake;
an airspeed indicator adapted to determine the speed of the rotorcraft;
a door actuator operatively coupled to the door and the fuselage, wherein the actuator operates the door to open and close the side air intake, wherein the door is in an open position when the airspeed is below a first threshold and is in a closed position when the airspeed exceeds a second threshold, wherein the second threshold is above the first threshold; and
control logic adapted to determine whether the airspeed is at or below the first threshold or at or above the second threshold to operate the actuator.

10. The rotorcraft airflow modulation system of claim 9, further comprising a manual override for manually positioning the door in an open or closed position.

11. The rotorcraft airflow modulation system of claim 9, further comprising the door actuator's operation is automated.

12. The rotorcraft airflow modulation system of claim 11, wherein the door captures the ram air to prevent a loss in inlet pressure recovery, when the door is in a closed position.

* * * * *